March 26, 1946.  C. J. SCRANTON  2,397,375
HARVESTER-THRESHER
Original Filed April 6, 1939  2 Sheets-Sheet 1
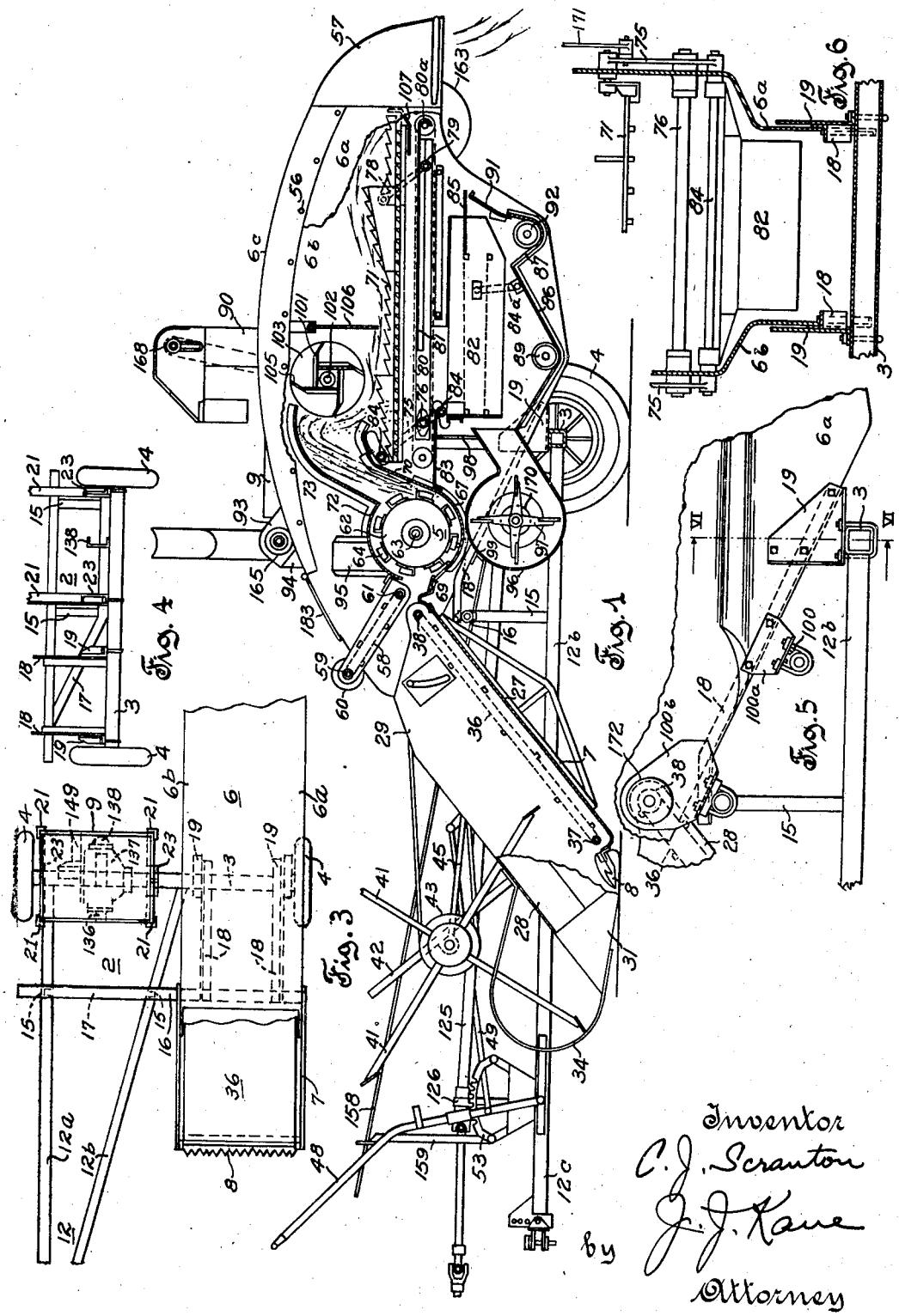
Inventor
C. J. Scranton
J. J. Kane
by
Attorney March 26, 1946.    C. J. SCRANTON    2,397,375
HARVESTER-THRESHER
Original Filed April 6, 1939    2 Sheets-Sheet 2
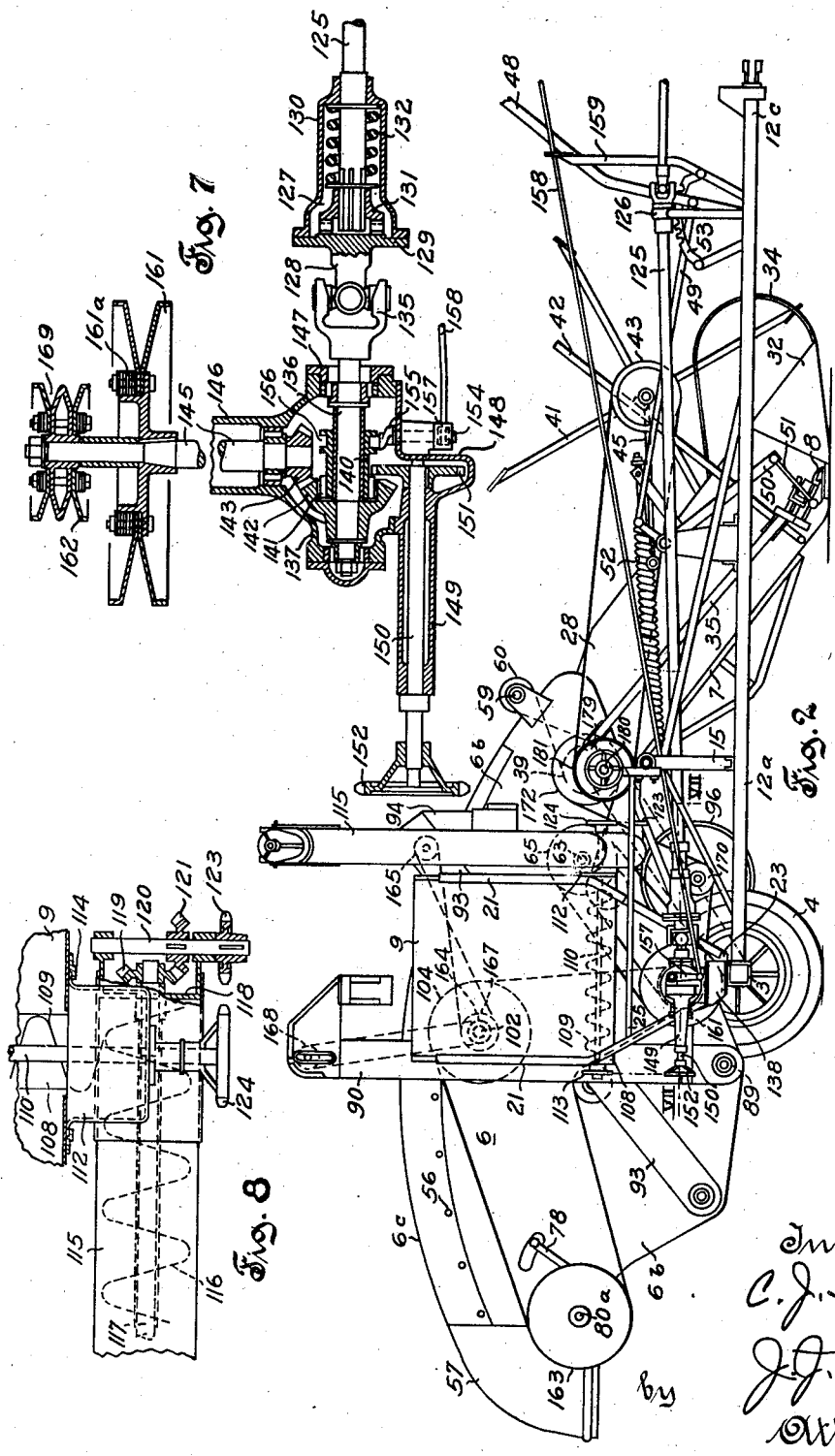
Inventor
C. J. Scranton
by J. J. Kane
Attorney Patented Mar. 26, 1946

2,397,375

UNITED STATES PATENT OFFICE 2,397,375

HARVESTER-THRESHER

Charles J. Scranton, La Porte, Ind., assignor to Allis-Chalmers Manufacturing Company, Milwaukee, Wis., a corporation of Delaware Original application April 6, 1939, Serial No. 266,291. Divided and this application April 26, 1941, Serial No. 390,447

5 Claims. (Cl. 56—21)

This invention relates in general to improvements concerned with or applicable to threshing machines, particularly such as are of the class known as harvester-threshers wherein the harvesting mechanism is combined in a single apparatus with the threshing and separating mechanisms.

The invention is more particularly concerned with improvements which contribute toward producing and rendering available to farmers working limited acreage, a harvester-thresher which may be of such relatively low weight, size and cost, and ready maneuverability about smaller sized farms, as to reasonably permit ownership and economic use of the machines on such farms.

The present application is a division of application S. N. 266,297, filed April 6, 1939, on which has been granted Patent No. 2,314,901, March 30, 1943.

Desirable results can well be attained in connection with the present invention through a design of apparatus wherein the harvesting and the threshing and separating mechanisms are of light weight and compact design and permit manufacture and assembly of these parts, and their ready assembly thereafter, either in the factory or after shipment from the factory, on a separately assembled supporting frame, this latter feature readily permitting transport, in a comparatively small space by train or truck, of the harvester-thresher in knocked-down condition, a feature which greatly reduces the cost of such transportation. Other desirable results, particularly in the matter of facility of operation and handling by a single operator are attained through suitable design and arrangement of driving mechanism for the various parts of the machine, readily permitting selective control, as from the position of the operator, to cause the operation of all parts of the harvester-thresher and the discharge of clean grain to the grain bin, either with or without the simultaneous discharge of grain from the bin to a wagon or the like, or the discharge of grain from the bin to the wagon or the like while the remainder of the apparatus is inoperative.

It is a general object of this invention to provide an improved design and construction of harvester-thresher, which enables the production of a machine that may be relatively light and inexpensive and capable of efficiently handling a wide variety of grain and seed crops with minimum power requirements.

It is a further object of this invention to provide an improved design and construction of harvester-thresher wherein the harvesting and the threshing and separating mechanisms are mounted on a supporting frame structure of improved design and permitting ready assembling of the complete machine and disassembling therefor facility in transportation and storage.

It is a further object of this invention to provide an improved design and construction of threshing machine, particularly such as is of the harvester-thresher type, including a receptacle for storing threshed grain or seed on the vehicle, wherein improved facilities are provided for the selective driving of the parts of the apparatus, to readily permit control by the operator, at will, of the storing of threshed grain in the receptacle while the other mechanisms are in normal operation, or the discharge of grain from the storing receptacle while such other mechanisms are either operative or inoperative.

These and other objects and advantages are attained by the present invention, various novel features of which will be apparent from the accompanying description and drawings, disclosing an embodiment of features of the invention, and are more particularly defined in the appended claims.

In the accompanying drawings:

Fig. 1 is a view in elevation, with parts in longitudinal section, from the grainward side, of a harvester-thresher embodying features of the present invention;

Fig. 2 is a view in side elevation, from the stubbleward side, of the harvester-thresher of Fig. 1;

Fig. 3 is a diagrammatic plan view, with parts omitted, of portions of the harvester-thresher;

Fig. 4 is a view, in rear elevation, of the supporting frame structure of Fig. 3;

Fig. 5 is a side elevation of details of the supporting arrangement;

Fig. 6 is a sectional view in the plane of the line VI—VI of Fig. 5;

Fig. 7 is an enlarged sectional plan view, in the plane of line VII—VII of Fig. 2, showing details of the selective driving mechanism for parts of the apparatus; and Fig. 8 is an enlarged plan view of details of the bin discharge conveyer mechanism in normal discharging condition.

In the embodiment of the invention disclosed in the drawings, a supporting frame 2 includes or is supported on an axle 3, the latter being of square tubular cross-section, supported on a pair of traction wheels 4 journaled in bearings at the ends of the axle.

The separating mechanism, and the threshing mechanism, including a threshing cylinder 5, are mounted within a housing 6, to the forward end of which a header platform 7 is pivoted for adjustment in a vertical plane to position the harvesting sickle 8, mounted at the forward end of the header platform, in desired position of adjustment relative to the ground.

A grain bin 9 is mounted on the axle-supported frame at the stubbleward side of the housing 6, the bin being preferably of such design and so disposed relative to the axle 3 that the bin and its contents are always substantially balanced fore and aft about the axle. Likewise, the remainder of the apparatus, including the supporting frame and the harvesting, threshing and separating mechanisms and the housing therefor are so designed and mounted that the weight of the entire apparatus is substantially balanced fore and aft about the axle, preferably with a very slight excess weight at the forward side of the axle to insure that the front end of the frame will drop to and rest lightly on the ground when the harvester-thresher is detached from the draft means for the machine, and may easily be lifted from the ground for attachment to the drawbar of a tractor.

The supporting frame 2 is made up of a draft portion or beam 12 including forwardly extending bars 12a, 12b in substantially the same plane, and connected, preferably in a detachable manner, to the axle 3, at the stubbleward side of the housing 6, the two bars being secured together at their forward end portion 12c, the rear portion of the bar 12b being inclined inwardly from the bar 12a. Upright bars 15 are secured to and suitably braced on the bars 12a, 12b, and a transverse horizontal bar 16 is supported on and secured to the uprights 15 at the upper ends thereof and extends toward the grainward side of the machine; and a brace bar 17 is secured to the bars 12a, 12b, or to the lower ends of upright bars 15, and has an upwardly inclined portion secured to and bracing the grainwardly extending portion of the bar 16. Rearwardly extending bars 18 are mounted at their forward ends on the grainward extension of the horizontal bar 16, these bars being preferably of right angle cross-section with their horizontal flanges turned toward each other, and the rear portions of the bars 18 are inclined downwardly. Vertical flange portions of supporting feet or plates 19 are secured, preferably by welding, to the rear ends of the bars 18, and the horizontal flanges of these feet 19 are in a position to be carried by the axle 3.

The frame structure may be mounted on the axle 3 by suitably securing the rear ends of the bars 12a, 12b and the supporting feet 19 to axle 3, preferably by bolted connections which, while serving to securely mount the frame structure on the axle, still permit ready assembling and disassembling, as for convenience in storing and shipping. And with the frame structure disposed wholly forward of the axle, a minimum length of the frame is attained.

The grain bin 9 includes a frame structure comprising vertical supporting bars 21, preferably in the form of angle irons, at the corners of the bin, the pair of bars at each side of the bin having their lower portions inclined toward each other and secured to a supporting foot 23 provided with a lower flange seating surface disposed to rest on the axle 3 to which it is secured, preferably in a detachable manner, as through the use of U-bolts passing underneath the axle. The bin structure is further supported and braced in a fore and aft direction by horizontal bars 25 bolted to the lower inclined portions of the bars 21 at each side of the bin and bolted, at their forward ends, to the horizontal bar 16 of the frame.

The header platform 7 consists essentially of a bottom plate 27 supported on a suitable bracing frame, with side walls 28 and 29 on the grainward and stubbleward sides, respectively, projecting at right angles from and preferably integral with the bottom plate, the header platform being adjustable up and down through the pivotal connection of the rear portion of the side walls 28, 29 with the forwardly projecting portion of the side walls of the housing 6. The forward edges of the side walls are provided with guards 31, on the grainward side, and 32, on the stubbleward side, tapering toward their forward edges. The guard 31 may be provided with a forwardly projecting divider extension 34. The cutting sickle 8, mounted with its conventional guard at the forward upwardly turned edge of the bottom plate of the header platform, is actuated by a pitman 35 suitably connected to the sickle, as through a bell crank lever suitably mounted on a bracket carried by the side wall 29.

A main conveying draper 36 is mounted on a lower or guide roller 37 rotatably mounted in the forward portion of the side walls of the header platform, and an upper or driving roller 38 mounted on a shaft rotatable in bearings carried by the forward portion of the side walls of the housing 6 and having its axis coincident with the pivotal axis about which the header platform is adjusted toward and from the ground. A driving sheave 39 is mounted on the stubbleward end of the shaft carrying the driving roller 38.

A gathering reel 41 is rotatably mounted in a bearing of suitably extended length carried by a supporting rod 42 pivotally mounted on a bracket carried by the stubbleward side wall 29 of the header platform, a driving pulley 43 being mounted on the reel shaft. The supporting rod 42 is held in desired predetermined position with respect to a perpendicular to the surface of the ground by a bracing rod 45, preferably adjustably secured in position on the adjacent side wall of the header platform. The position in which the bearing for the reel shaft is secured on the rod 42 is preferably capable of adjustment up and down to vary the height of the reel above the cutting sickle carried at the forward edge of the header platform.

The conveying draper 36 is of substantially the same width as the threshing cylinder 5, and the cutting sickle may be of the same width as the draper and the threshing cylinder; and with this relation of these parts, which are in line with each other in the direction of travel of the machine, the swath of grain cut by the sickle falls, or is carried by the reel, rearwardly onto the forward portion of the main draper 36, across substantially the full width thereof, and the grain is carried upwardly by the draper, with the grain heads first, toward the threshing cylinder, the cut grain being thus fed to the cylinder across substantially the full width thereof.

The header platform is adjustable up and down about its pivotal support, thus varying the distance of the cutting sickle above the ground, by means of an actuating lever 48 pivoted on the forward portion of the draft frame 12, this lever being connected, through a connecting rod 49, bell crank lever 50 and link 51, to a bracket on the stubbleward side wall 29 of the header platform near the front end thereof. A biasing spring 52, attached to an extension on the bell crank lever 50 and secured at its rear end to a portion of the frame 2, serves to counterbalance the weight of the header platform and hence facilitate adjustment thereof through the actuating lever 48. This actuating lever may be provided with a latch releasably cooperative with a slotted quadrant 53, fixed to the draft frame 12, to provide for maintaining the actuating lever and the header platform in desired position of adjustment.

The housing 6 for the threshing and separating mechanisms is assembled as a unitary housing from two spaced side wall plates 6a, 6b and a roof plate 6c, the latter preferably being slightly rounded and provided with curved depending flanges, the side walls being secured to the roof plate to form the housing by connecting the depending flanges of the roof plate to the upper edges of the side plates, by riveting, welding or the like, as indicated at 56. The side walls may be of relatively thin plate material, and their relatively rigid supporting relation with respect to the roof and the internal elements of the threshing and separating mechanism, referred to hereinafter, may be augmented by means of suitable spacing and bracing plates or rods. The housing includes a hood 57 whose forward open edge fits over the rear edges of the roof and side plates when in assembled relation, and whose upper and rear sides are formed in substantial prolongation of the curved roof and side plates, this hood being open at its under side. This hood may be permanently secured to the roof and side plates; however, it is preferably detachably secured in position by bolts passing through the forward edge portions of the hood and the cooperative edge portions of the roof and side plates.

The lower portions of the side walls 6a, 6b are preferably bent inwardly, providing a space of reduced width between the side walls, this space being occupied by a grain cleaning attachment including a device for supplying cleaning air to the grain cleaning device, as will be referred to hereinafter.

An upper conveying draper 58 is disposed within the forward portions of the side walls of the housing 6 and located above the rear end of the main draper 36. The upper or driving roller 59 of the upper draper is mounted on a shaft journaled in bearings carried by the side walls 6a, 6b of the housing, or an extension therefrom, and carries a driving sheave 60 on its stubbleward end; and the lower or guide roller 61 of this draper is mounted on a shaft journaled in the side walls 6a, 6b, this guide roller 61 being positioned to the rear of the upper roller 38 of the main draper. The arrangement of the draper 58 is such that the lower course of this draper moves rearwardly, in a downwardly inclined direction, and serves to press the material on the rear end of the main draper and to forcibly carry such material downwardly from the rear edge of the main draper and to the under side of the rotating threshing cylinder 5.

The threshing cylinder 5 is in the form of an open drum comprising spaced circular plates 62 mounted on a shaft 63, these circular plates having peripheral flanges on which circumferentially spaced longitudinally extending beater or threshing bars 64 are mounted, these bars being preferably slightly inclined from a direction parallel to the axis of the cylinder shaft. The cylinder shaft 63 is rotatably supported in bearings secured in position in the opposed side walls of the housing 6, preferably by mounting the bearings in plates covering apertures in the side walls of sufficient size to permit insertion of the threshing cylinder into position through such an aperture. The bearings are preferably adjustable in their supports, so as to permit adjustment of the axis of the threshing cylinder upwardly in a direction slightly inclined from the vertical. The stubbleward side of the cylinder shaft is provided with a driving pulley 65 which serves to supply power to the shaft.

A stationary threshing element or concave is provided at the lower side of the cylinder, this concave being preferably in the form of an imperforate plate 67 slightly spaced from and following the general curvature of the lower portion of the path of the cylinder threshing bars, this concave plate being attached, preferably by flanges integral with the plate, to the side walls of the housing 6. The upper face of the concave plate 67 is provided with one or more longitudinally extending stationary threshing bars of heretofore known conventional form and disposition. The forward edge of the concave plate and the rear edge of the bottom plate 27 of the header platform are in overlapping relation at a point adjacent the upper roller 38 of the main feed draper 36, preferably with a suitable form of choke or ledger plate overlapping the forward edge of the concave plate and adjustable toward and from the path of the cylinder, as indicated at 69.

The rear part of the substantially circular body portion of the concave extends upwardly, preferably following a tangent, to a point slightly above the cylinder shaft; and this rear portion of the concave has an upwardly rising extension 70 therefrom, the lower portion of such extension substantially following the tangent, and the upper portion thereof curving rearwardly to a slight extent to a point above and preferably just beyond the forward edge of an oscillating shaking rack 71, with the extreme upper end of the extension preferably turned slightly downward. Upwardly extending spaced rake-like spring fingers of the hereinabove described general shape of the upper rear portion of the extension of the concave, may be substituted for such concave plate extension.

The upper side of the threshing cylinder is enclosed by a housing plate 72 extending between the side walls of the housing 6 and preferably secured thereto by integral flanges at the side edges of such plate. This plate 72 follows the curvature of, and is slightly spaced from, the path of the rotating cylinder bars. The forward edge of the plate 72 terminates in the rear of and adjacent the rear end of the upper feeding draper 58; and this housing plate 72 extends rearwardly to a point substantially beyond the axis of the cylinder. This housing plate 72 has a rearward extension 73, the forward portion of this extension rising upwardly and rearwardly at an angle of approximately forty-five to sixty degrees to the horizontal, and extending substantially parallel to the rear tangent portion 70 of the concave plate 67; and the rear portion of this extension 73 curves upwardly and easily toward the roof of the housing, with the rear edge portion of the extension preferably inclined slightly downward from the horizontal.

The separating rack 71 may be of a heretofore know shaking type, but of shorter length than has heretofore been considered of suitable commerical efficiency; and it is mounted in the housing 6 in the rear of the threshing cylinder; and the rack is of a width only slightly less than the distance between the upper portions of the side walls 6a, 6b of the housing. The rack 71 extends forwardly to a point beneath the rear end of the concave extension, thus insuring that all of the straw and grain from the threshing mechanism will drop onto the rack and be subjected to the separating action of the latter.

The rack 71 is suspended from the upper ends of rocker arms or links secured on transverse shafts pivotally mounted in bearings in the side walls of the housing 6, rocker arms 75 at the forward end of the rack being mounted on a transverse shaft 76 and rocker arms or links 78 near the rear end of the rack being secured on a transverse shaft 79. The rocker arms or links are preferably mounted on the outer sides of the housing side walls and have extensions at their upper ends projecting through elongated slots in the side walls, the rack being suspended on such extensions.

Grain dropping through the rack 71 falls through a conventional form of traveling grain drag 80, driven by sprockets on the rear or driving shaft 80a of the drag. The upper course of the grain drag moves forwardly and the lower course rearwardly, a plate 81 being disposed beneath the rear portion of the upper course of the grain drag, so that grain dropping through this portion of the drag is carried to the forward edge of the plate 81, whence it drops through the lower course of the drag, to the forward portion of the sieve of a cleaning shoe 82, which usually comprises a plurality of superposed screens or sieves. Grain falling through the forward portion of the rack falls through both courses of the drag 80, a part falling on a transverse partition wall 83 from which it is drawn rearwardly by the drag to a point where it drops on the forward end of the upper screen of the cleaning shoe; and another portion of the grain drops through both courses of the drag directly onto the upper sieve.

The desired vibratory motion is imparted to the cleaning shoe by suspending the forward portion of the same on a transverse shaft 84 carried by the lower extensions of the rocker arms 75, the upper portions of which suspend the forward portion of the rack 71, and suspending the rear portion of the cleaning shoe on a pair of links 84a pivoted to the side walls of the housing.

The upper sieve of the cleaning shoe is provided with a tailings rake 85 or apertured plate to permit unthreshed heads to fall therethrough, while at the same time carrying pieces of straw, which have passed onto the sieve, from the rear end of the rake, this straw dropping or being blown to the ground by the cleaning air.

The side walls 6a, 6b are closed beneath the cleaning screen, and likewise braced at this point, by adjoining trough-shaped plates 86, 87 each preferably having flanges at its side edges through which these plates are secured to the side walls. The trough plate 86 lies beneath the body portion of the cleaning shoe, in position to receive all grain dropping through the cleaning sieves and convey the grain by gravity to a transverse screw conveyer 89 which conveys the grain, along the trough and through a tubular extension attached to the stubbleward side of the trough, to an elevating conveyer 90, this elevator being attached to or braced on the adjacent housing wall 6b and discharging the grain to the bin 9, or as may be desired, to discharge chutes positioned over a bagging platform which may be substituted for the grain bin.

The trough plate 87 lies beneath the tailings rake 85 in position to receive material passing through the rake and material passing over the rear edge of the lower screens of the cleaning shoe. The rear side of the trough 87 is preferably provided with a detachable extension wall 91 extending upwardly and rearwardly toward the discharge end of the tailings rake 85 and in position to insure that the trough 87 receives all unthreshed grain and grain heads which pass through the tailings rake. A transverse conveyer 92 is disposed at the bottom of the trough 87 and conveys the tailings along this trough and through a tubular extension, communicating with the stubbleward side of the trough, to an elevating conveyer 93, this elevator being attached to or braced on the stubbleward side wall 6b of the housing and having a discharge communicating with a chute or conveyer 94 which conveys the tailings to a suitably positioned discharge device 95 extending between the side walls 6a, 6b, for feeding the tailings to the threshing cylinder through the upper forward portion of the upper enclosing wall 72 of the cylinder chamber, for a second threshing operation on such tailings. A forward extension from the upper plate 72 opposite the tailings discharge 95, prevents the tailings from being thrown forward over the upper side of the auxiliary draper 58.

Each of the side walls 6a, 6b of the body, where the latter encloses the separating mechanism, is depressed at its lower portion at a point below the plate 83 to provide a space of reduced width between these walls wherein the cleaning shoe and a portion of the housing 96 of a fan 97, for supplying cleaning air to the cleaning shoe, are located. The housing 96 of the fan, in conjunction with the concave plate 67 constitutes a substantial closure for the forward end of this space. The upper edge of this inwardly depressed portion of the side walls, from a point adjacent the forward edge of the plate 83, extends forwardly adjacent, and following the curvature of, the concave plate 67 to the front edge thereof, the depressed portion of the side walls terminating adjacent this point. The discharge end of the housing 96 of the centrifugal fan 97, projects rearwardly through an aperture in a plate or frame 98 which serves as a bracing plate between the lower portion of the side walls, and likewise may complete the front closure of the space within the side walls wherein the cleaning shoe is located. The fan housing 96 may be attached in position wholly through attachment to the side walls 6a, 6b of the main housing, or to transverse plates or braces attached thereto; or, preferably, the fan housing may be readily attached in and detached from position with respect to the main housing, after the latter is mounted in position on the frame, a bracket 99 attached to the fan housing being used to detachably mount the fan housing on the rearwardly extending bars 18. The shaft of the fan 97 may be mounted, while the latter is in place within its housing, in bearings 100 suspended by U-bolts from hangers 100a detachably mounted on the rearwardly extending bars 18.

The lower edge of the part of the side walls 6a, 6b, overlying the inclined portion of the rearwardly extending bars 18 of the supporting frame are provided with inwardly bent stiffening flanges adapted to rest on the inwardly turned flanges of the supporting bars 18, as indicated in Figs. 5 and 6. Bolts or screws passing through the adjacent upright flanges of the bars 18 and the walls 6a, 6b serve to attach this portion of the housing to the supporting frame structure;

and where the bars 18 are secured to the supporting feet 19, the housing attaching bolts also pass through the upright flanges of these supporting feet. The forward end of the housing 6 is further supported and braced on the horizontal bar 16 of the frame, as more particularly shown in Fig. 5, through U-bolts passing around the underneath side of the bar 16, the legs of the U-bolts being detachably secured directly to inwardly flanged portions of the side walls of the housing, or to inwardly flanged portions of reinforcing plates or hangers 100b mounted on the side walls, preferably with a suitable form of saddle block interposed between the upper side of the bar 16 and the flanges to which such U-bolts are attached.

The center of gravity of the body comprising the housing 6 and parts carried thereby is in the rear of the axle 3, but the support and attachment of the housing to the frame structure, particularly through the horizontal bar 16 of the frame structure, causes a definite portion of the weight of the housing to be transmitted through the frame forwardly of the axle, and the result is that the housing and frame, when thus assembled, have their combined weight substantially balanced about the axle, preferably with a slight excess of weight at the forward side of the axle to insure that the forward end of the draft beam 12 may rest lightly on the ground and may be easily lifted from the ground for attachment to the drawbar of a tractor.

In the operation of the machine, the grain severed by the harvesting sickle is carried rearwardly by the reel onto or toward the main feed draper 36, the latter being of a width to receive the full width of the swath severed by the cutting sickle. And the draper conveys a steady thin stream of cut grain, with the grain heads foremost, to and across the full width of the threshing cylinder, and the threshed grain and stalks are threshed and discharged from the threshing cylinder in a thin and substantially even stream toward the separating mechanism for action by the latter.

A rotary beater 101, capable of exerting a fan action, may be provided in the separator housing over the forward portion of the separating rack and in a position substantially to the rear and above the threshing cylinder. The rotary beater 101, having a plurality of substantially imperforate vanes, is mounted on a transverse shaft 102 in the upper part of the separating chamber near the forward end thereof, the beater shaft being mounted in bearings on the side walls 6a, 6b, or preferably, the bearings at one or both sides, instead of being mounted in the side wall itself, are mounted in a plate removably attached to the side wall of the housing about an opening of sufficient size to permit bodily removal and insertion of the beater into operative position. As indicated, the beater vanes are set at right angles to one another and held between annular side plates 103 and attached to hub structures mounted on the beater shaft adjacent the inner surface of the side walls of the housing; and the beater shaft 102 is provided with a driving pulley 104 outside of the stubbleward side of the housing 6. The vanes preferably have their radially outer ends inclined rearwardly, as indicated at 105, and these outer ends are preferably formed as teeth, capable of exerting a combing action on the straw which loosens grain particles therefrom and likewise separates matted portions of the straw.

The beater is located above the threshing cylinder, and is of slightly less diameter than the threshing cylinder. The upper portion of the path of the beater is preferably slightly above the rear end of the deflecting roof or plate 73; and the rear edge of the plate 73 projects into close proximity to the path of the vanes of the beater, thus preventing the passage of straw to the upper side of the beater.

The tangential rear portion of the concave wall guides the material discharged from the threshing cylinder, in a thin stream of a width substantially equal to that of the cylinder, in a path which causes the material to be projected toward the curved upper portion of the wall 73, and the material is deflected therefrom downwardly toward the path of the beater 101 and the rack 71. The operating effect of the beater fan in assisting the recovery of grain from the straw and in moving the latter rearwardly along the rack will be apparent from the more detailed description thereof in applicant's Patent No. 2,314,901, March 30, 1943.

A swinging baffle 106 is pivoted at its upper end on projections from the side walls or the roof of the housing 6, in the rear of the beater 101, and receives the impact of any straw thrown forcibly by the beater toward the rear of the rack, and insures that the straw passes steadily along the rack and is subjected to the vibratory action thereof throughout the remainder of its length. An inclined pan or baffle 107 is attached to the rack beneath its rear edge, the lower edge of this pan projecting forwardly to a point above the upper course of grain drag 80 and over the rear edge of the plate 81, to insure that all of the threshed grain or seed passing through the rack is recovered.

The bottom of the grain bin 9 is tapered from the grainward and stubbleward sides toward the center to provide a well portion 108 extending longitudinally of the direction of travel of the machine; and a screw conveyer 109 on a shaft 110 is disposed in this well, and projects through an opening in the front wall of the grain bin into a hollow cap 112 which closes the opening in the wall of the grain bin. The shaft of the conveyer 109 projects through a bearing arranged axially at the front end of the cap 112; and the rear end of this conveyer shaft passes through a bearing in the rear wall of the grain bin, and it is provided with an externally located driving sprocket 113. This hollow cap 112 is provided at its rear edge with an annular flange which fits closely within an offset annular flange at the inner periphery of an annular clamping plate 114 removably secured to the front wall of the bin about the opening therein. The fit of the flange on the cap 112 beneath the flange on the clamping plate 114 is such as to provide a close fit while at the same time permitting rotation of the cap about the conveyer shaft 110 as an axis, upon the application of force to the cap.

On the under side of the enclosing cap 112 and communicating through the wall of the cap with the interior thereof, is a tubular housing 115 extending at an angle to the vertical when in operative discharging position, the cap and discharge element being formed or assembled as a unitary device. A screw conveyer 116 is provided within the tubular housing 115, and its centrally located shaft 117 has bearings in the opposite ends of the housing. The lower end of the bin discharge housing 115 is preferably closed by an element 118 having a central aperture through which the end of the conveyer shaft 117 projects and in which it has a bearing, the projecting end of this shaft being provided with a bevel driving gear 119. The element 118 may have extensions providing spaced bearings for a shaft 120 on which is mounted a bevel gear 121, meshing with the bevel gear 119. The shaft 120 is driven by a sprocket 123 and a driving chain connection from a sprocket 124 on the conveyer shaft 110. When it is desired to discharge grain to a wagon alongside the machine, the bin discharge elevating conveyer 115, 116 is dropped down, about the axis of the shaft 110, to a position where the discharge end of the conveyer projects over the side of the machine; and, when it is not desired to discharge to a wagon, and particularly when the machine is drawn to and from the field, this elevator may be swung up to any suitable position, where it does not project beyond the side of the machine, and retained in such position by suitable means.

Power is supplied to the various operating mechanisms of the apparatus through a drive shaft 125 whose forward end is mounted in a bearing 126 supported on the forward end of the draft frame 12, the forward end of the drive shaft having a suitable flexible power connection for attachment to a power takeoff shaft on a tractor whose drawbar is flexibly coupled to the front end of the draft frame 12.

The rear end of the drive shaft 125 is connected, through a longitudinally extensible joint and a power limiting device 127, to a shaft coupling 128. As indicated, the shaft coupling 128 is provided with a flange 129 at its forward end to which is attached a flanged coupling sleeve 130 surrounding and having a guiding fit at its forward end with the drive shaft 125. The front face of the flange 129 within the sleeve 130 is provided with clutch projections meshing under ordinary driving conditions, with corresponding projections on an overload release clutch member 131 surrounding and splined, in freely reciprocating relation, to the rear end portion of the drive shaft. The clutch members are normally held in clutching arrangement by a compression spring 132 surrounding the drive shaft and exerting pressure, through suitable abutment collars, against the slidable clutch member 131 and an internally formed shoulder at the front end of the sleeve 130.

The shaft coupling section 128 is connected through a universal joint 135 to a shaft 136 mounted in bearings at the front and rear sides of a housing 137, supported on a base or pedestal 138 carried by the supporting frame structure, or preferably fixed on the axle 3, beneath the grain bin 9. Slidably splined on the shaft 136, in driving relation therewith, within the housing, is an annular element 140 formed at its rear end with a spur gear 141. A gear 142 is freely rotatable on the rear portion of the shaft 136, this gear being restrained against moving forwardly on the shaft through abutment against a shoulder on the shaft. The gear 142 is formed with internal spur gear teeth adapted to mesh with the teeth of spur gear 141, and it is formed at its forward side with external bevel gear teeth meshing with the teeth of a bevel gear 143 mounted on the inner end of a transverse shaft 145 suitably mounted in bearings in a grainwardly extending tubular projection 146 of the housing. The bearing for the shaft 136 in the forward side of the housing is mounted in an opening in the housing, provided with a detachable closure plate 147, and perferably of sufficient size to permit removal of the annular element 140 along with the shaft 136 on which it is mounted.

The stubbleward side of the housing 137 is closed by a removable hollow closure element 148 having a rearwardly projecting tubular extension 149 which provides spaced bearings for a shaft 150 therein. On the inner end of the shaft 150 is mounted a spur gear 151 suitably held in definite position wherein the spur gear 141 may be brought into mesh with the teeth of the spur gear 151, when the element 140 is adjusted to certain positions. The rear end of the shaft 150 is provided with a driving sprocket 152 for connection, through a driving chain, to the driving sprocket 113 on the shaft 110 of the bin conveyer.

An operating spindle 154 passes through the closure element 148. The inner end of this spindle, lying within the housing 137, is of crank formation, as indicated at 155, with the terminal portion thereof disposed in an annular recess 156 at the front end of the annular element 140. The outer end of the spindle is provided with an operating arm 157, and an operating rod 158 attached thereto passes forwardly over the draft frame and is supported near its forward end on a fixed arm 159 carried by the draft frame. An operating handle on the forward end of this rod 158 is located at a point where it is readily accessible to the operator of the tractor, so as to be operated by push or pull, to adjust the annular element 140 to any desired one of its three operative positions.

With the annular element 140 adjusted, through the operating spindle 154, arm 157 and rod 158, to its rear position, indicated in Fig. 10, wherein the spur gear 141 meshes only with the internal teeth on the gear 142, the main drive shaft operates the countershaft 145, through the gears 142 and 143, and through a sheave 161 and a V-belt connection therefrom to the sheave 65 on the cylinder shaft, the latter is driven. The shaft 145 also drives the beater 101, through a sheave 162 on shaft 145 and a V-belt driving connection therefrom to the sheave 104 on the beater shaft; and through this same belt connection and a sheave 163 on the driving shaft 80a of the grain drag 80, the latter is driven.

The shaft of the beater, through a sheave 164 thereon and a V-belt connection therefrom to a sheave 165 on the grainward side of the upper shaft of the tailings elevator 93, drives the latter; and the elevator chain of the latter serves to drive the shaft at the lower end of the tailings elevator, this latter shaft carrying the tailings conveyer 92. And the shaft of the beater, through a sprocket 167 thereon and a driving chain connection therefrom to a sprocket 168 on the grainward side of the upper shaft of the clean grain elevator 90, serves to drive the later; and the elevator chain of the latter drives the shaft of the clean grain conveyer 92, associated with the lower end of such elevator.

The shaft 145, through a third sheave 169 thereon and a crossed V-belt connection therefrom to a sheave 39 on the shaft of the upper roller 38 of the main feed draper 36, drives the latter. And this same driving belt also cooperates with a sheave 170 on the shaft of the fan 97 to drive the latter. A crank connection on the shaft of the upper roller 38 of the main feed draper 36 actuates the pitman connection 35 for driving the cutting sickle.

A pitman connection 171 to the rocker arm 75 at the grainward side wall 6a of the housing 6 may serve, through a suitable eccentric connection of the pitman to the shaft 102 of the rotary beater, to impart the desired oscillatory movement to the shaking rack 71 and the cleaning shoe 82.

A crossed V-belt connection from the sheave 172 on the grainward side of the shaft of the driving roller 38 of the main feed draper 36 to the sheave 60 on the adjacent end of the shaft of the driving roller 59 of the auxiliary feed draper 58, serves to drive the latter.

As referred to hereinabove, the bin conveyer 109 is driven through a driving chain associated with the sprocket 113 on the shaft 110 and the sprocket 152 on the drive shaft 150, when the spur gear 141 is suitably meshed with the spur gear 151 on shaft 150. And, through the drive chain connection between the sprocket 124 on the forward end of the shaft 110 and the sprocket 123 on the shaft 120, the latter is actuated, to thereby drive, through bevel gears 119, 121, the bin discharge elevating conveyer 116.

The gathering reel 41 is driven from the stubbleward traction wheel through a sprocket associated with such wheel and a driving chain connection therefrom to a sprocket 179 on a shaft 180 mounted in bearings carried by the frame, preferably the horizontal rod 16 thereof, and a sheave 181 on such shaft and a V-belt connection therefrom to the driving sheave 43 on the reel shaft. The extended length and flexibility of this V-belt connection insures satisfactory driving of the reel in its various positions of adjustment.

It will be apparent that, when the sliding element 140 is in its rear position of adjustment, indicated in Fig. 10, wherein the spur gear 141 meshes only with the internal teeth of the gear element 142, the main drive shaft is effective, through this gear connection and the shaft 145, to drive the active parts of the grain harvesting, threshing and separating mechanisms, including the rotary beater 101 and the discharge of grain to the grain bin. And in this position of adjustment, the spur gear 141 is ineffective to drive the countershaft 150 associated in driving relation to the bin discharge conveyer 109 and the discharging elevator 116.

When the sliding element 140 is adjusted forwardly to an intermediate position, the gear 141 remains in driving relation with the internal teeth of the gear 142, and it also comes into driving relation with the spur gear 151 on countershaft 150, thus also placing the bin discharge conveyer 109 and the elevating discharge conveyer 116 in operation.

When the sliding element 140 is adjusted to its full forward position, the driving relation between the gear 141 and the gear 142 is broken, while the driving connection between the gear 141 and the gear 151 on the countershaft 150 remains, and hence the bin discharge mechanism is operative, thus permitting removal of the contents of the grain bin while the threshing and separating mechanisms are inoperative.

It will be apparent that this selective driving mechanism permits, at will, the normal harvesting, threshing and separating operations with the discharge of clean grain to the grain bin, either with or without simultaneous discharge of grain from the bin, or the discharge of grain from the bin while the harvesting, threshing and separating mechanisms are inoperative.

The roof plate 6c of the housing 6, instead of extending as a single piece to its forward edge, preferably terminates at a point above the forward edge of the threshing cylinder, and a roof extension 183 is hinged to the forward edge of the body portion of the roof and extends forwardly to a point just in the rear of the auxiliary feed draper 58, so that, on lifting the hinged cover plate 183, access may be had to the space underneath.

While the discharge of clean grain from the machine, through the elevator 90, is described as being into a grain bin, it will be apparent that as to certain features of the invention, a bagging arrangement may be substituted for the grain bin and its appurtenant parts.

With the grain bin and the forwardly extending supporting frame detachably mounted on the axle and the body or housing for the harvesting and separating elements detachably mounted on its support, but still providing a rigidly united assembly, and the header platform detachable from the body or housing, as it is preferably arranged, the design of the harvester-thresher, through this detachability of sections, is such as to permit a relatively large number of machines to be shipped, in knocked-down form, on a single car, thus reducing costs of transportation.

It should be understood that my invention disclosed herein is not limited to the exact details of design and construction described and shown herein, and that it embraces various embodiments of the invention within the scope of the annexed claims.

It is claimed and desired to secure by Letters Patent:

1. In a harvester-thresher of the type adapted to be drawn and operated by a tractor and comprising a wheeled supporting structure, harvesting, threshing and separating mechanism mounted thereon, a shaft for driving a portion of said mechanism, a bin for receiving and storing threshed grain, a discharge conveyer for said grain bin, a shaft for driving said discharge conveyer, and a main power shaft rotatably mounted on said supporting structure and adapted to be driven from said tractor, in combination, a unitary selective power transmission device carried by said supporting structure and comprising a housing, a shaft section connected to said power shaft and having a portion thereof within said housing and rotatably mounted in bearings in fore and aft portions of said housing, an end portion of said mechanism driving shaft and said conveyer driving shaft extending into said housing and rotatably mounted in bearings therein, means within said housing and driven by said shaft section connected to said power shaft and selectively adjustable for connecting said shaft section in driving relation to said mechanism driving shaft either in conjunction with or independently of said conveyer driving shaft or to said conveyer driving shaft independently of said mechanism driving shaft, and means operable from a point external of said housing for actuating said selectively adjustable means to effect desired driving relations, said operating means including an operating connection extending to a point within easy reach of the tractor operator.

2. In a harvester-thresher of the type adapted to be drawn by a tractor, and comprising a supporting structure including a supporting frame having a draft element for connection to the drawbar of a tractor, harvesting, threshing and separating mechanisms mounted on said supporting structure, a grain receiving bin mounted on said supporting structure, power operated means for discharging grain from said bin to a point external thereof, a drive shaft carried by said draft element and detachably connectable to a power source on the tractor, driving mechanism for operating said harvesting, threshing, and separating devices, and driving mechanism for operating said bin discharge means, in combination, a selective gear transmission between said drive shaft and said two driving mechanisms and enclosed within a supporting housing carried by said supporting structure, and said selective transmission comprising a shaft section connected to said drive shaft and rotatably mounted in said housing, a sliding gear element on said latter shaft section and interchangeably connectable with either or both of two gears each associated with one of said two driving mechanisms, and means for actuating said sliding gear element to cause said drive shaft to selectively drive the driving mechanism for said harvesting, threshing and separating devices either in conjunction with or independently of the driving mechanism for said bin discharge means or to drive the driving mechanism for said bin discharge means independently of the driving mechanism for said harvesting, threshing and separating devices.

3. In a tractor-drawn, power-operated harvester-thresher comprising harvesting, threshing and separating mechanism and a grain bin to receive threshed grain therefrom, mechanism for discharging grain from said bin to a point external thereof, and a power shaft for supplying power to said mechanisms, in combination, a unitary selective power transmission device comprising an adjustable driving element connected in driven relation to said power shaft and connectible in driving relation to said harvesting, threshing and separating mechanism and to said bin discharge mechanism, and means for selectively adjusting said driving element to cause the latter to drive said harvesting, threshing, separating mechanism and said bin discharge mechanism simultaneously or to drive either of said mechanisms alone.

4. In a tractor-drawn, power-operated harvester-thresher comprising harvesting, threshing and separating mechanism and a grain bin to receive threshed grain therefrom, mechanism for discharging grain from said bin to a point external thereof, and a power shaft connectible to a power source on a tractor to which said harvester-thresher is connected in draft relation for supplying power to said mechanisms, in combination, a unitary selective power transmission device comprising an adjustable driving element connected in driven relation to said power shaft and connectible in driving relation to said harvesting, threshing and separating mechanism and to said bin discharge mechanism, and means for selectively adjusting said driving element to cause the latter to drive said harvesting, threshing and separating mechanism and said bin discharge mechanism simultaneously or to drive either of said mechanisms alone, said adjusting means comprising an operating connection extending forwardly to a point where it is manipulable by the tractor operator while in his normal position on the tractor.

5. In a tractor-drawn, power-operated harvester-thresher comprising a supporting frame carrying harvesting, threshing, separating mechanism and a grain bin to receive threshed grain therefrom and having a draft portion connectible to the tractor, mechanism for discharging grain from the bin to a point external thereof, and a power shaft carried by said draft portion and connectible to a power source on the tractor for supplying power to said mechanism, in combination, a unitary enclosed selective power transmission device mounted on said frame and comprising an enclosing housing within which said power shaft extends, an adjustable driving element within said housing and in driven relation to said power shaft, gear driving elements within said housing and connected to said harvesting, threshing, separating mechanism and said bin discharge mechanism, respectively, means for selectively adjusting said adjustable driving element associated with power shaft to establish driving relation therethrough from said power shaft to said gear driving elements associated with both said harvesting, threshing, separating mechanism and said bin discharge mechanism simultaneously or to either of said latter driving elements alone, and an operating connection extending forwardly from said adjusting means to a point within ready reach of the tractor operator for actuation thereby.

CHARLES J. SCRANTON.